INVENTOR
Walter A. Thum.
By [signature]
ATTORNEY

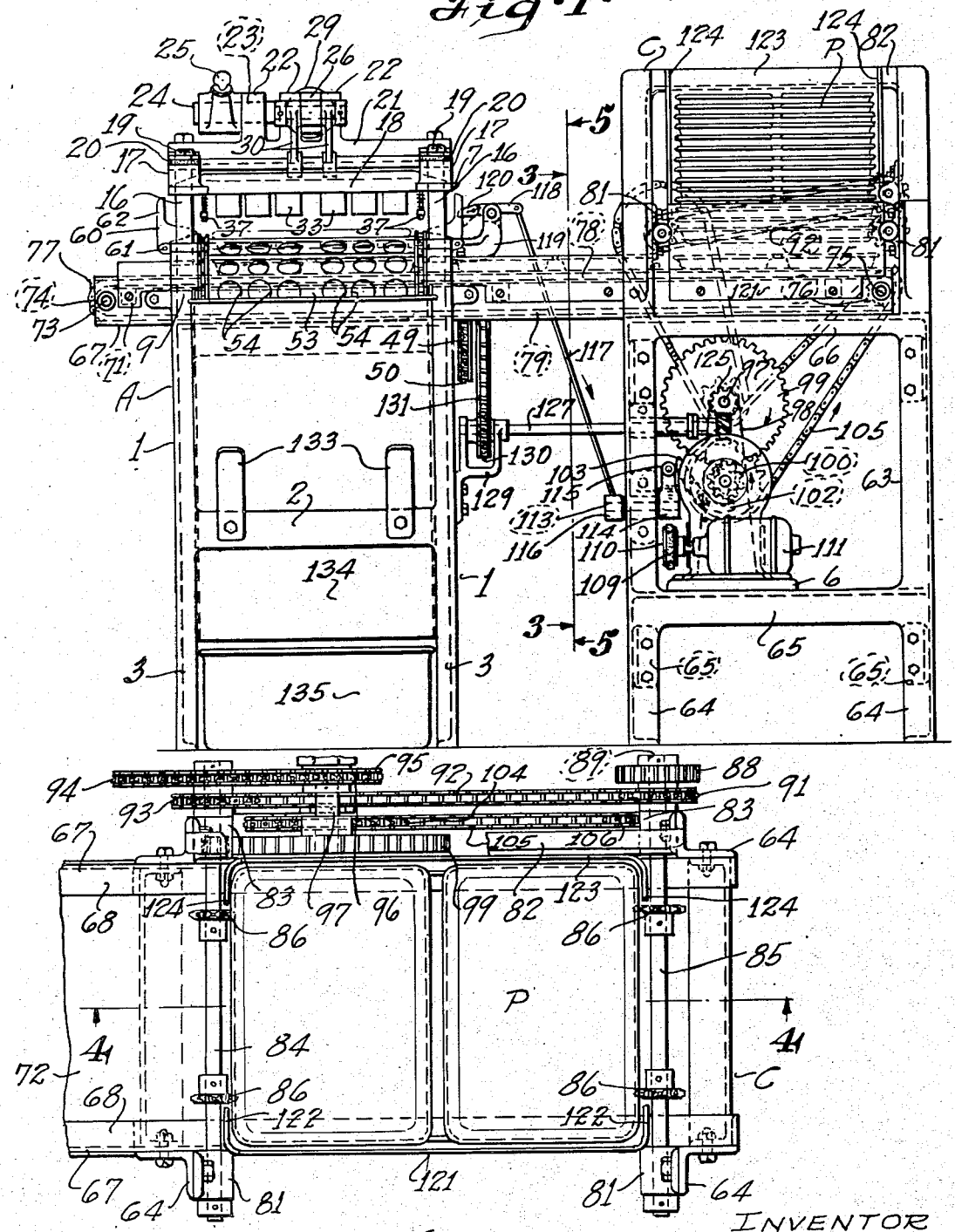

April 14, 1942. W. A. THUM 2,279,420
BISCUIT CUTTING AND PANNING MACHINERY
Filed Sept. 6, 1940 4 Sheets-Sheet 4

INVENTOR
Walter A. Thum.
BY
ATTORNEY

Patented Apr. 14, 1942

2,279,420

UNITED STATES PATENT OFFICE 2,279,420

BISCUIT CUTTING AND PANNING MACHINERY

Walter A. Thum, St. Louis, Mo., assignor to Papendick, Inc., St. Louis, Mo., a corporation of Missouri Application September 6, 1940, Serial No. 355,628

14 Claims. (Cl. 107—6)

This invention has to do generally with baking machinery and, more particularly, relates to a certain new and useful improvement in machines for cutting and panning biscuits.

My invention has for its primary object the provision of a unitary machine uniquely constructed for simultaneously cutting biscuits at a high rate of speed and automatically feeding pans into position for receiving the biscuits.

My invention also has for another object the provision of a machine for the purposes stated, which is economical in cost of construction, operation, and maintenance, which cuts the dough and pans the biscuits smoothly and uniformly, and which is so constructed as to cut and pan an extremely large quantity of biscuits while utilizing the services of a single workman.

And with the above and other objects in view, my invention resides in the novel features of form, construction, arrangement, and combination of parts presently described and pointed out in the claims.

In the accompanying drawings (four sheets)—

Figure 1 is a front elevational view of a biscuit cutting and panning machine constructed in accordance with and embodying my present invention;

Figure 2 is a fragmental top plan view illustrative of the pan feeding mechanism of the machine;

Figure 5:
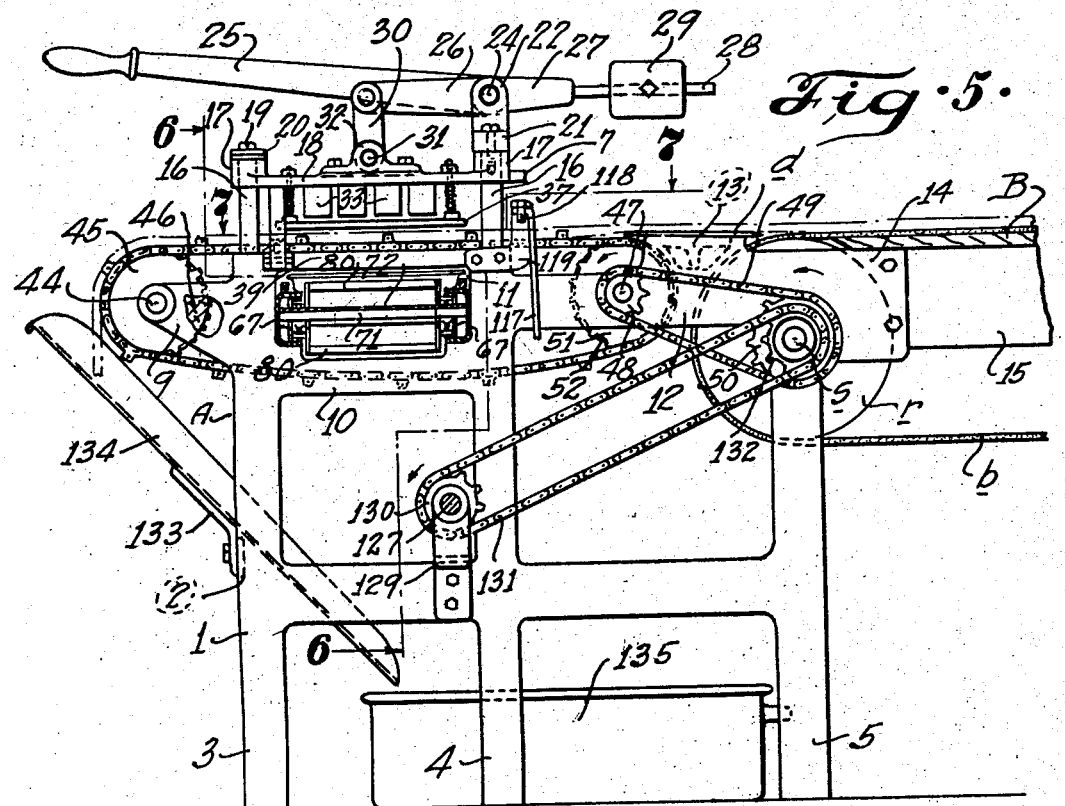
Figure 5 is a sectional view of the machine taken approximately along the line 5—5, Figure 1.
Figure 6:
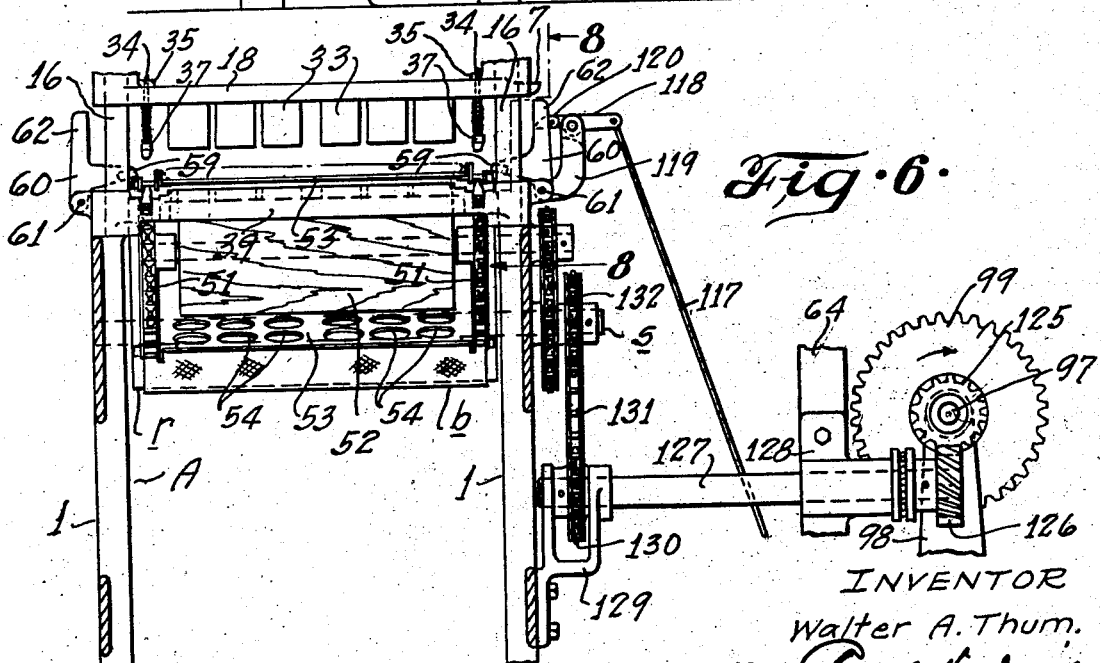
Figure 7:
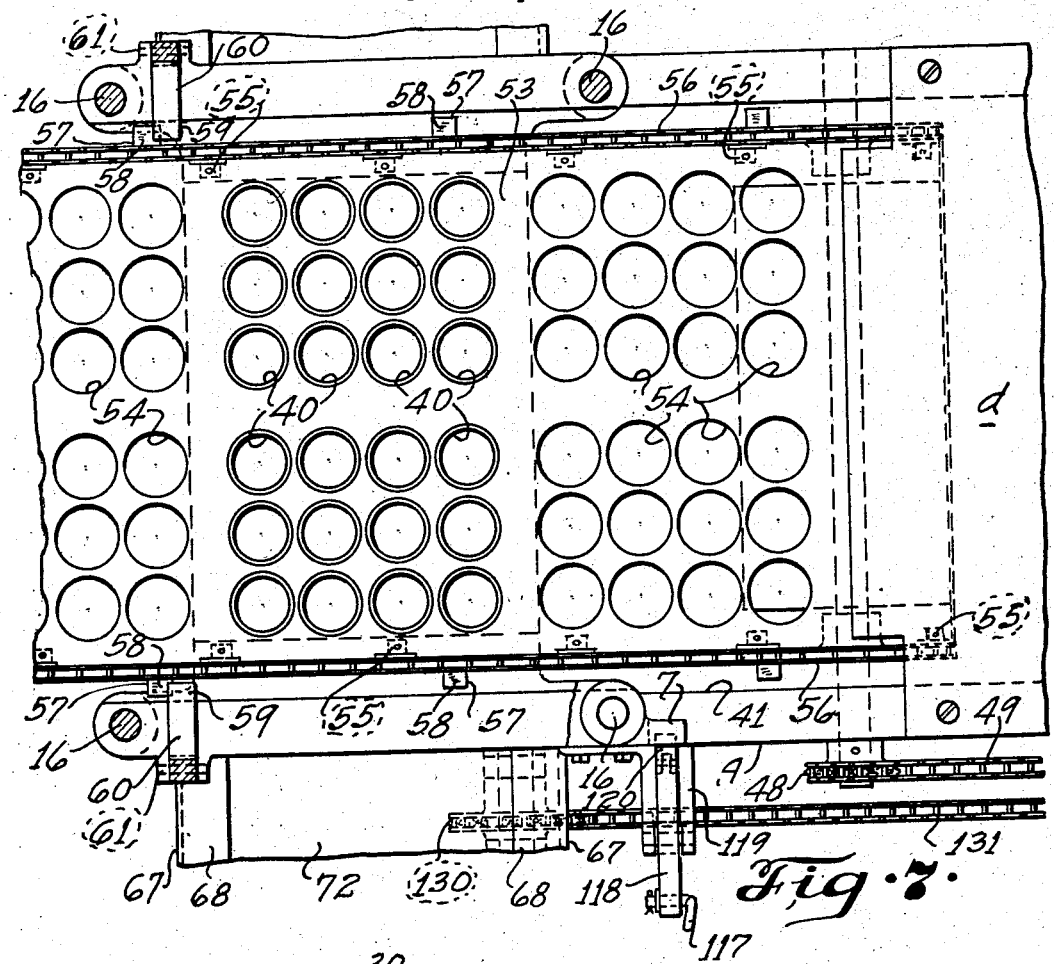
Figure 8:
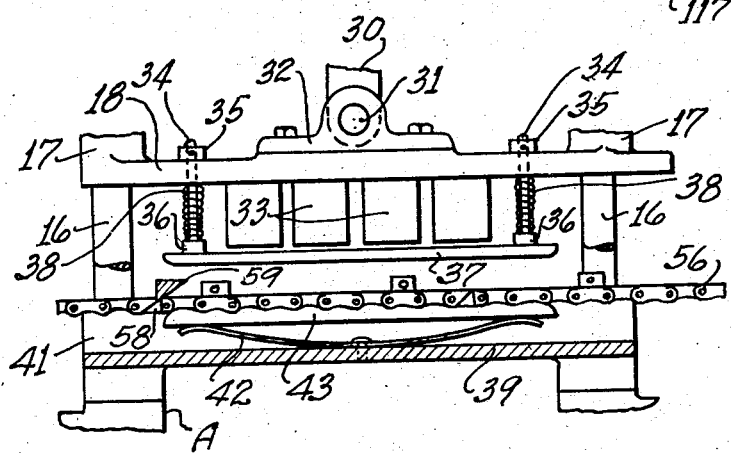

Figures 6 and 7 are fragmentary sectional views of the machine, taken approximately along the lines 6—6 and 7—7, respectively, Figure 5; and Figure 8 is a fragmentary sectional view of the machine, taken approximately along the line 8—8, Figure 6.

Referring now in more detail and by reference characters to the drawings, which illustrate a preferred embodiment of my invention, the machine includes a biscuit cutting unit A comprising a rectilinear table made up of side panels or frames 1 transversely connected in spaced parallel rigid relation by cross rails 2 and each having forward, intermediate, and rearward vertical legs 3, 4, 5.

Forming part of the side-frames 1, are forwardly projecting bearing arms 9, opposed parallel side plates 10 having registering rectangular apertures 11, and narrow top rails 12 provided upon their upper margins with upwardly projecting flat-topped shoulders 13.

Extending rearwardly from the rails 12 and rear legs 5, are attachment wings 14 for bolted engagement with the side rails 15 of a conventional dough-feeding conveyor B, which includes a continuous belt b trained over a supporting roll r suitably fixed upon a horizontal drive shaft s journaled in and projecting through the rear frame legs 5, all as best seen in Figures 1 and 5 and for purposes presently fully appearing.

Fixed in, and projecting vertically upwardly from, the upper margins of the side plates 10, are transversely aligned longitudinally spaced pairs of guide posts 16 for shiftably accommodating bored lugs 17 formed preferably integrally at the four corners of a horizontally disposed rectangular head-plate 18, the forward posts 16 being provided with diametrically enlarged cap-screws 19 and interposed cork or other suitably shock-absorbing washers 20 for stop-engagement with the forward lugs 17.

Bolted or otherwise suitably secured upon the upper ends of the rear posts 16 and extending transversely therebetween, is a horizontally disposed cross-beam 21 centrally provided with a plurality of upstanding lugs 22 having registering apertures 23 for rotatively accommodating a short jack-shaft 24, in turn, rigidly provided at one extended end with a forwardly presented radial handle 25, and pinned to the shaft 24 intermediate a pair of the lugs 22, is a rock arm 26 having a rearwardly presented extension 27 provided with a co-axial rod-like extension 28 for shiftably supporting a counter-weight 29.

Pivoted at their upper end upon the forward end of the rock arm 26, is a pair of links 30, in turn, at their lower end pivotally connected by means of a pintle 31 to a crank eye 32 bolted or otherwise suitably secured upon, and centrally of, the upper face of the head-plate 18. Upon its under face, the head-plate 18 is provided with a plurality of downwardly projecting cylindrical punch-cups or cutter members 33 for cutting through the biscuit-dough. In this connection, it may be stated that any convenient number of cutters 33 may be employed, and that such cutters 33 may be arranged or grouped in any conventional manner, depending upon the size and shape of the biscuit pan into which the biscuits will ultimately be placed.

Mounted for shiftable movement through the head-plate 18, are pairs of longitudinally aligned vertically disposed rods 34 at their upper ends provided with set collars 35 and at their lower ends fixed in upwardly projecting bosses 36 of rails 37 extending longitudinally of the machine upon opposite sides of the punch-members 33. Coiled on the rods 34 intermediate the head-plate 18 and the bosses 36, are compression springs 38 for normally yieldingly urging the rails 37 downwardly, all as best seen in Figure 8 and for purposes presently fully appearing.

Suitably mounted along its longitudinal margins upon the upper faces of the frame side-plates 10 and disposed horizontally therebetween beneath the head-plate 18, is a die-plate 39 provided with a plurality of apertures 40 sized and positioned for co-operative registration with the several punch members 33. Adjacent its longitudinal margins, the die-plate 39 is provided with longitudinally extending upwardly opening channels or grooves 41, and riveted or otherwise suitably fixed centrally upon the bottom wall of each groove 41, is a bow-shaped leaf spring or the like 42 for resiliently or yieldingly supporting a horizontally disposed elevating slide 43.

Journaled at its ends in, and extending horizontally between, the forwardly extending frame brackets 9, is an idler shaft 44 provided with a pair of sprocket members 45 and an intermediate roller 46, the latter being formed of wood, fiber, or other suitable material and having substantially the same diametral size as the sprocket members 45.

Similarly journaled at its ends in, and extending horizontally between, the frame rails 12, is an auxiliary drive shaft 47 projecting at one end through a rail 12 and provided on such projecting end with a sprocket 48 connected by means of a sprocket chain 49 to an auxiliary sprocket 50 pinned upon the extended end of the drive shaft s. Pinned upon the auxiliary drive shaft 47 inwardly of the side rails 12, are sprockets 51 peripherally aligned with the sprockets 45. Also fixed upon the shaft 47 intermediate the sprockets 51, is a roller 52 substantially identical with the roller 46, and trained over the rolls 46, 52, is a continuous belt 53 formed of extremely flexible stainless steel or other suitable material and provided with a plurality of sets of apertures 54 slightly larger in diametral size than the die-plate apertures 40. Each of the sets of belt apertures 54 is so arranged as to register with die-plate apertures 40, and at its longitudinal margins the belt 53 is connected by means of lugs 55 to endless sprocket chains 56 trained over the pairs of peripherally aligned sprockets 45, 51, so that, as the belt 53 is shifted, it will always be under positive control and may be accurately stopped with one of its groups of apertures 54 in substantially exact registration with die-plate apertures 40, all as best seen in Figure 7.

Mounted at suitably spaced intervals upon, and projecting laterally outwardly from, the chains 56, are wedge-shaped lugs 57 having upwardly presented oblique faces 58 for successive engagement with the respective inwardly extending ends 59 of locking-members 60 suitably pivoted, as at 61, upon the adjacent frame side plates 10 and each having an upwardly extending arm 62 adapted to swing normally inwardly into endwise abutment with the under face of the head-plate 18 for blocking or preventing its downward movement. The lugs 57, however, are so positioned that, when the belt 53 comes to rest in properly registered position over the die plate 39, the oblique lug faces 58 will come into engagement with the respective lock-member ends 59 and rock the stop-arms 62 outwardly and out of head-plate blocking position, all as best seen in Figure 6.

Positioned in laterally spaced relationship to the cutter-unit A, is a pan feeding unit C, which latter includes a suitable table made up of side frames 63 having four vertically disposed legs 64 transversely connected by horizontally disposed bottom rails 65 and front and rear top rails 66, the latter being positioned substantially in the same plane as the side plate apertures 11 of the cutter unit frame A. Bolted or otherwise suitably secured to the front rail 66 and extending horizontally through the cutter-frame apertures 11, is a pair of spaced rails 67 of U-shaped channel section and having inwardly presented parallel flanges 68, 69. Mounted at their ends on, and extending horizontally between, the webs 70 of the channel rails 67, are narrow cross bars 71 for supporting a horizontal table plate 72 extending longitudinally along the rails 67.

Figure 3:
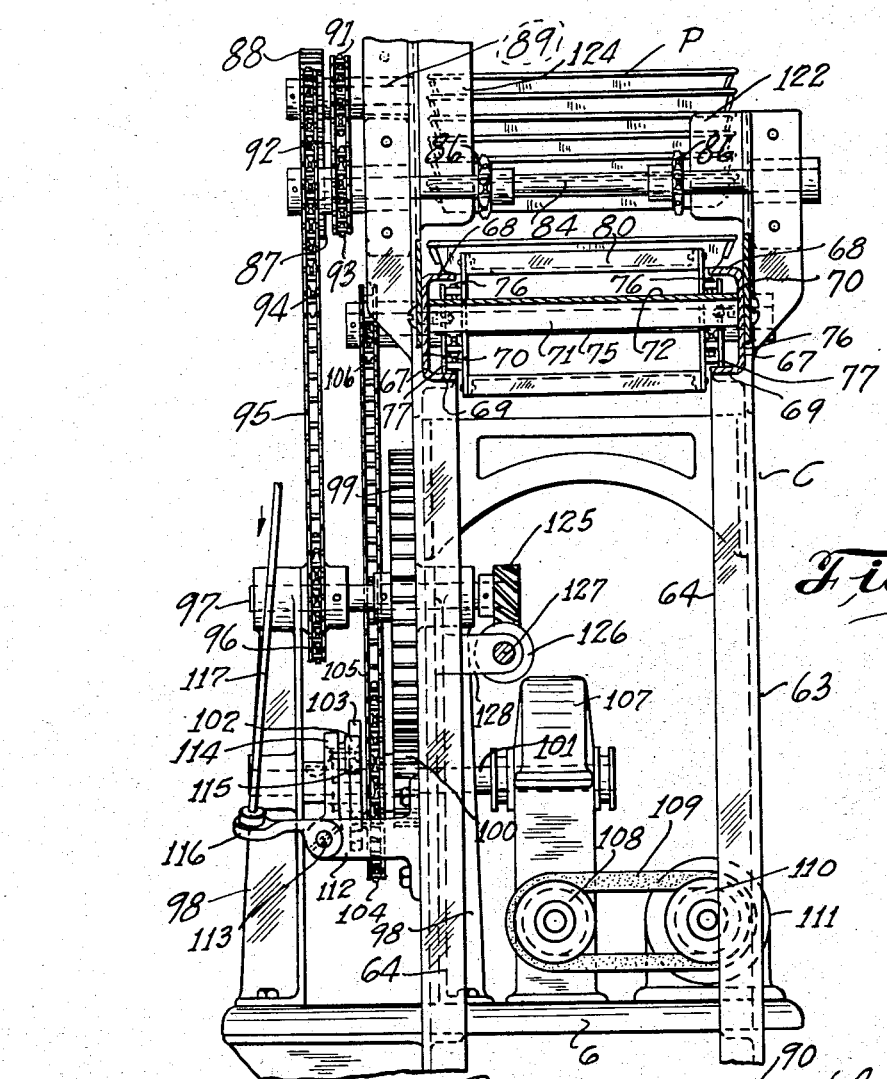
Figure 3 is an enlarged vertical sectional view of the machine, taken approximately along the line 3—3, Figure 1.
Figure 4:
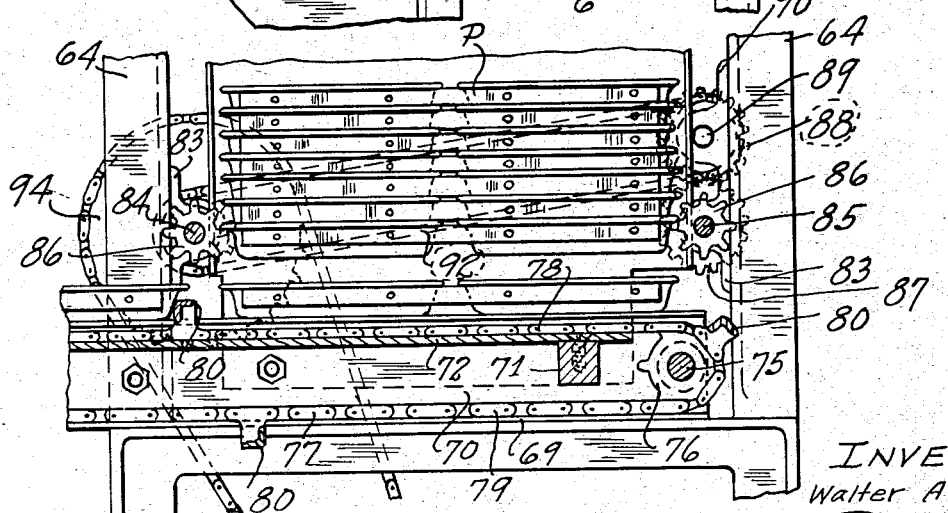
Figure 4 is an enlarged fragmentary longitudinal sectional view of the machine, taken approximately along the line 4—4, Figure 2.

Journaled at its ends in, and extending horizontally between, the projecting ends of the rails 67, is an idler shaft 73 provided with spaced sprockets 74. Likewise journaled in, and extending between, the opposite ends of the rails 67, is a driven shaft 75 similarly provided with sprockets 76 positioned in peripheral alignment with the sprockets 74, and trained over the sprockets 74, 76, are continuous conveyor chains 77 each having its upper horizontal run 78 resting upon the upper face of the table 72 and its lower horizontal run 79 resting on the upper face of the lower rail flanges 69. Mounted at their ends in, and extending horizontally between, the chains 77, are spaced flight bars 80 projecting respectively above and below the rail flanges 68, 69, all as best seen in Figure 3 and for purposes presently fully appearing.

The forward frame-legs 64 extend upwardly a short distance above the rails 67 and are provided upon their opposed faces with journal bearings 81, while the rear legs 64 project substantially beyond the upper ends of the forward legs 64 and are transversely connected by a cross-beam 82. On their opposed faces, the rear legs 64 are likewise provided with journal bearings 83 respectively aligned with the forward journal-bearings 81.

Journaled at their ends respectively in, and extending horizontally between, the aligned pairs of bearings 81, 83, are a driven shaft 84 and an idler shaft 85, each provided with peripherally aligned pairs of toothed pan-feeding wheels 86. At its rear end, the idler shaft 85 projects through a bearing 83 and is provided with a pinion 87 for meshing engagement with a companion pinion 88 fixed upon a rearwardly projecting stub-shaft 89 journaled at its forward end in a bearing bracket 90, in turn, fixed to the frame-legs 64 just above the bearing member 83.

Also pinned to the sub-shaft 89, is a sprocket 91 connected by means of a sprocket chain or the like 92 to a sprocket 93, in turn, pinned or keyed upon the rearwardly extending end of the driven shaft 84.

Also keyed upon the projecting end of the driven shaft 84 in outwardly spaced relation to the sprocket 93, is a driving sprocket 94 connected by means of a sprocket chain 95 to a sprocket 96 pinned upon a jack-shaft 97 journaled at its ends in, and extending horizontally between, upstanding journal brackets 98.

Also pinned upon the jack-shaft 97, is a large drive gear 99 meshing with a drive pinion 100 rotatably mounted upon a main drive shaft 101 likewise journaled at its ends in, and extending horizontally between, the journal brackets 98 and connected to the shaft 101 by means of a conventional pawl clutch 102 having an outwardly projecting actuating arm 103.

Fixed upon the hub of the drive pinion 100, is an auxiliary drive sprocket 104 connected by means of a sprocket chain 105 to a sprocket 106 pinned upon the rearwardly projecting end of the pan conveyor drive shaft 75.

At its forward end, the main drive shaft 101 projects into a conventional reduction gear box 107 mounted upon the upper face of a base plate 6 and having a drive pulley 108 conventionally connected by means of a drive belt 109 to a sheave 110 of an electric motor 111 likewise mounted upon the base plate 6 and adapted for connection by any suitable conduit means (not shown) to a suitable source of electric current.

Mounted upon the rearwardly presented face of the frame-leg 64 adjacent the pawl clutch 102, is a short bracket 112 for pivotally supporting a horizontally disposed rock shaft 113 provided at its one end with an actuating arm 114 having a roller 115 for engagement with the pawl arm 103. Pinned upon the other end of the rock shaft 113, is a crank arm 116 connected by means of an obliquely extending link-rod 117 to an actuating lever 118 pivotally mounted upon a suitable bracket 119, in turn, bolted or otherwise secured upon the side face of the adjacent cutter frame-leg 4.

At its opposite end, the lever 118 is provided with a spring-pressed latch member 120 positioned in the path of the projecting shoulder 7 of the head-plate 18 and so arranged that, as the head-plate 18 moves downwardly, it will engage and pass the latch member 120, but on upward movement will engage the latch member 120, which will, in turn, rock the lever 118, shifting the link-rod 117 downwardly, and rocking the roller 115 out of engagement with the pawl clutch arm 103, and causing the pawl clutch 102 to become engaged for a single revolution.

Marginally secured to, and extending upwardly from, the rails 67 between the forward pair of frame-legs 64, is a sheet metal front plate 121 preferably integrally provided along its vertical margin with inwardly extending narrow flanges 122, and likewise marginally secured upon the opposite rail 67, is a similarly shaped back-plate 123 projecting inwardly beyond the upper margin of the front plate 121 and marginally secured at its opposite or upper end to the upper margin of the cross-beam 82. Along its vertical margin, the back-plate 123 is preferably integrally provided with forwardly projecting flanges 124 aligned with the front plate flanges 122 for receiving and guiding a stack of biscuit pans P, all as best seen in Figures 1 and 2.

At its forward end, the jack-shaft 97 is provided with a spiral pinion 125 for driving engagement with a spiral gear 126 pinned upon one end of a connecting shaft 127 rotatively at an end mounted in, and extending through, a bracket 128 fixed upon the adjacent frame-leg 64. At its opposite end, the shaft 127 is journaled in, and extends through, the upper ends of a clevis 129 bolted or otherwise suitably secured upon the side face of a cutter frame 1, and pinned upon the shaft 127 intermediate the arms of the clevis 129, is an intermediate drive sprocket 130 connected by means of a sprocket chain 131 to a driven sprocket 132 keyed upon the outer end of the shaft s, all as best seen in Figures 1, 5, and 6.

Bolted or otherwise suitably secured upon a cutter frame cross bar 2 is a pair of obliquely upwardly extending strap-brackets 133, and welded or otherwise fixed upon the upper faces thereof, is an obliquely extending slide pan 134 projecting at its upper end outwardly beyond the forward belt-supporting roller 46 and at its lower end between the frame-legs 3 and over a removable catch pan 135, all as best seen in Figure 5 and for purposes presently fully appearing.

In use and operation, a stack of nested pans P is set into the pan-feeding mechanism C between the front plate 121 and the rear plate 123, the peripheral bead of the bottom pan of the stack resting upon selected teeth of the pan feeding wheels 86. The motor 111 is then set in operation.

Concurrently, a flat sheet of dough is placed upon the belt b of the feed conveyor B and progressed across the dead plate d. The lever 118 is thereupon manually tripped by the operator, so that the single revolution pawl clutch 102 is engaged and the driving pinion 100 rotated. This rotary movement of the driving pinion 100 is transmitted through the various sprockets and chains, so that the pan-feeding wheels 86 are caused to rotate, dropping a single pan unit P downwardly upon the rail flanges 68 in front of one of the flight rods 86, which progresses such deposited pan along the rails to a position directly beneath the die-plate 39.

Simultaneously, the apertured belt 53 is progressed forwardly, conveying the forward portion of the dough sheet across the dead plate d and into position over the die-plate 39.

As these operations are completed, the pawl clutch 102 will have completed a single revolution, and the arm 103 thereof will strike against the roller 115 of the pawl-actuating arm 114, thereby becoming disengaged and the entire mechanism will become stationary. Thereupon the operator manually grasps the handle 25 and, by swingably actuating the same downwardly, shifts the head-plate 18 and the associated cutters 33 downwardly, initially bringing the bars 27 downwardly into engagement with the belt-supporting chains 56 and shifting the same downwardly against the upward bias of the slide bars 43 and bow-springs 42, thereby bringing the belt 53 into flatwise overlying engagement with the upper face of the die-plate 39. Continuous downward movement of the head-plate 18 will compress the springs 38 and force the cutters 33 into the dough and through the die 39 and thereby punch a plurality of biscuit-shaped disks through the die-plate apertures 40 and deposit the same in properly spaced relation in the pan unit P. Since the biscuit-disks are not cut but sheared, they do not adhere to the punches. On the contrary, they drop freely into the pan, and since the pan is very close to the bottom of the die and the punches protrude through the die, the biscuit-disks are in perfect spaced relation in the pan.

As the head-plate 18 returns to initial position, the lug 7 engages the latch member 120 and trips the lever 118 for re-engaging the pawl clutch 102. The filled pan P is automatically thereupon shifted from beneath the die-plate 39 and a subsequent empty pan P brought into position. At the same time, the residual portion of the punched-out dough sheet falls into the slide pan 134 and ultimately is directed into the catch pan 135, an unpunched dough sheet being brought into position beneath the cutter members 33 for a subsequent punching operation. As the head-plate 18 moves upwardly, the rails 37 are likewise lifted from engagement with the chains 56, so that the belt 53 will be lifted slightly upwardly out of contact with the upper face of the die-plate 39 by the elevator bars 43 and bow-springs 42, so that the edges of the belt apertures 54 will not accidentally catch upon the edges of the die-plate apertures 40.

As has been pointed out, during movement of the chains 56 and belt 53, the arms 62 of the locking members 60 will be in position to prevent or block accidental or unauthorized downward movement of the head-plate 18. When, however, a pan P is in place and the belt 53 is stopped in proper registration with die-plate apertures 40, the locking members 60 will be swung outwardly from beneath plate 18, so that the plate 18 may then be freely shifted downwardly for a dough-punching operation.

It will thus be evident that, by my present invention, I have provided a biscuit-cutting and panning machine in which the pan-feeding and biscuit-cutting mechanism are entirely synchronized and interrelated, and which, therefore, may be easily and conveniently controlled by a single operator for achieving a very high rate of production. It will also be evident that the machine is rugged, durable, substantially automatic in all its operations, and cannot be operated in any unauthorized or accidental manner.

It should be understood that changes and modifications in the form, construction, arrangement, and combination of the several parts of the machine may be made and substituted for those herein shown and described without departing from the nature and principle of my invention.

Having thus described my invention, what I claim and desire to secure by Letters Patent is:

1. A biscuit cutting and panning machine including a die-plate having a plurality of spaced apertures, a reciprocable head-member having a plurality of downwardly presented dough-cutters arranged for co-operable sliding engagement in the die-plate apertures, and a continuous belt movable over the die-plate and having a plurality of sets of apertures positioned for registration with the die-plate apertures and sized for clearance of the dough-cutters.

2. A biscuit cutting and panning machine including a die-plate having a plurality of spaced apertures, a reciprocable head-member having a plurality of downwardly presented dough-cutters arranged for co-operable sliding engagement in the die-plate apertures, a pair of spaced rollers mounted on opposite sides of the die-plate, a continuous belt trained around the rollers and over the die-plate and having a plurality of sets of apertures positioned for registration with the die-plate apertures and sized for clearance of the biscuit cutting members, means for intermittently driving the belt, and means actuable by the head-member for setting the belt-driving means in operation.

3. A biscuit cutting and panning machine including a die-plate having a plurality of spaced apertures, a reciprocable head-member having a plurality of downwardly presented dough-cutters arranged for co-operable sliding engagement in the die-plate apertures, a belt movable over the die-plate and having a plurality of sets of apertures positioned for registration with the die-plate apertures and sized for clearance of the dough cutters, and means for feeding a pan unit beneath the die-plate for receiving the cut dough sections.

4. A biscuit cutting and panning machine including a die-plate having a plurality of spaced apertures, a reciprocable head-member having a plurality of downwardly presented dough-cutters arranged for co-operable sliding engagement in the die-plate apertures, a belt trained for movement over the die-plate and having a plurality of sets of apertures positioned for registration with the die-plate apertures and sized for clearance of the dough-cutters, a pan magazine, pan conveying means disposed under the magazine and extending beneath the die-plate, means for successively one by one delivering the pans from the magazine upon the conveyor, and driving means associated with the conveyor for successively positioning and progressing the deposited pans beneath the die-plate.

5. A biscuit cutting and panning machine including a die-plate having a plurality of spaced apertures, a reciprocable head-member having a plurality of downwardly presented dough-cutters arranged for co-operable sliding engagement in the die-plate apertures, a belt trained for movement over the die-plate and having a plurality of sets of apertures positioned for registration with the die-plate apertures and sized for clearance of the dough-cutters, a pan magazine, pan conveying means disposed under the magazine and projecting beneath the die-plate, means for successively one by one delivering the pans from the magazine upon the conveyor, transmission means associated with the conveyor for successively positioning the deposited pans beneath the die-plate, driving means, and a single revolution clutch means for connecting the driving means and the transmission means.

6. A biscuit cutting and panning machine including a die-plate having a plurality of spaced apertures, a reciprocable head-member having a plurality of downwardly presented dough-cutters arranged for co-operable sliding engagement in the die-plate apertures, a belt trained for movement over the die-plate and having a plurality of sets of apertures positioned for registration with the die-plate apertures and sized for clearance of the dough-cutters, a pan magazine, pan conveying means disposed under the magazine and projecting beneath the die-plate, means for successively one by one delivering the pans from the magazine upon the conveyor, transmission means associated with the conveyor for successively positioning the deposited pans beneath the die-plate, driving means, single revolution clutch means for connecting the driving means and the transmission means, auxiliary transmission means also connected through the clutch to the driving means for progressing the belt, and means actuable responsive to movemnt of the head-plate for tripping the single revolution clutch.

7. A biscuit cutting and panning machine including means for intermittently progressing a dough-sheet, means for disposing pans beneath the dough-sheet in timed relation to the movement of the dough-sheet, and means for cutting a plurality of sections from the dough-sheet and depositing the same in the disposed pans.

8. A biscuit cutting and panning machine including means for intermittently progressing a dough-sheet along a predetermined path, means for moving dough pans along a path angularly disposed to, and spaced downwardly from, the path of movement of the dough-sheet for disposing a pan beneath the dough-sheet when the dough-sheet is stationary, and means for cutting a plurality of sections from the dough-sheet and depositing the same in the disposed pan.

9. In combination, in a biscuit cutting and panning machine, means for feeding a dough-sheet, means for successively cutting a plurality of sections from the sheet, a pan-magazine, a pan conveyor disposed under the magazine and projecting beneath the dough cutting means, and means for successively delivering the pans from the magazine upon the conveyor in timed relation to the movement of the dough-sheet for disposition beneath the dough-sheet for receiving and panning the successively cut sections.

10. A biscuit cutting and panning machine including means for intermittently progressing a dough-sheet, means for disposing a pan beneath the dough-sheet in timed relation to the movement of the dough-sheet, means for cutting a plurality of sections from the dough-sheet and depositing the same in the disposed pan, and means for preventing actuation of the dough-cutting means when the dough-feeding means is in motion.

11. In combination, in a biscuit cutting and panning machine, a plurality of dough-cutting members, and dough-feeding means including a belt-member apertured for clearance of the dough-cutting members.

12. In combination, in a biscuit cutting and panning machine, a plurality of dough-cutting members, and a continuous belt having a plurality of sets of apertures sized for clearance of the dough-cutting members.

13. In combination, in a biscuit cutting and panning machine, a plurality of reciprocable dough-cutting members, and dough-feeding means including a pair of spaced parallel rolls and an endless belt-member trained over and around said rolls and apertured for clearance of the dough-cutting members.

14. In a biscuit cutting and panning machine, in combination, a plurality of reciprocable dough-cutting members, a fixed apertured die-plate disposed beneath and co-operable with the dough-cutting members, and endless dough-feeding belt having an upper run trained over the die-plate and a lower run trained beneath and spaced downwardly from the die-plate, said belt being provided with a plurality of apertures positioned for alignment with the apertures of the die-plate and sized for clearance of the dough-cutting members, and means for feeding pans through the space between the runs of the endless belt beneath the die-plate.

WALTER A. THUM.